United States Patent [19]

Gerdes et al.

[11] Patent Number: 5,512,530
[45] Date of Patent: *Apr. 30, 1996

[54] CATALYST CARRIER

[75] Inventors: William H. Gerdes, Hudson; Donald J. Remus, Stow; Thomas Szymanski, Hudson, all of Ohio

[73] Assignee: Norton Chemical Process Products Corp., Worcester, Mass.

[ * ] Notice: The portion of the term of this patent shall not extend beyond the expiration date of Pat. No. 5,384,302.

[21] Appl. No.: 304,911

[22] Filed: Sep. 12, 1994

[51] Int. Cl.$^6$ .............................. B01J 21/00; B01J 21/04
[52] U.S. Cl. ............................................ 502/351; 502/439
[58] Field of Search ...................................... 502/439, 351

[56] References Cited

U.S. PATENT DOCUMENTS

| | | | |
|---|---|---|---|
| 5,380,697 | 1/1995 | Matusz et al. | 502/348 |
| 5,384,302 | 1/1995 | Gerdes et al. | 502/439 |

*Primary Examiner*—Shrive Beck
*Assistant Examiner*—Fred J. Parker
*Attorney, Agent, or Firm*—David Bennett

[57] ABSTRACT

A catalyst carrier that is comprised of relatively large alpha alumina particles dispersed in matrix that comprises an alpha alumina formed in situ by a sol-gel process and titania has excellent crush resistance while retaining good porosity and catalytic performance.

9 Claims, No Drawings

CATALYST CARRIER

This invention relates to catalyst carriers and specifically to catalyst carriers based on alumina that may be used as supports for metal and metal oxide catalyst components of use in a variety of chemical reactions.

BACKGROUND OF THE INVENTION

The use of alumina based catalyst carriers has previously been described in a number of patents including U.S. Pat. Nos. 5,100,859; 5,055,442; 5,037,794; and 4,874,739. Such carriers have a wide variety of potential applications in the catalytic field and are especially useful where the alumina base is alpha alumina.

A catalyst support needs to possess, in combination, at least a minimum surface area on which the catalytic component may be deposited, high water absorption and crush strength. The problem is that usually an increase in one can mean a reduction in another property. Thus high crush strength may mean low porosity. Often the balance is achieved by trial and error making the catalyst carrier art even more unpredictable than other chemical process art.

A way has now been found to design carriers with more confidence as to the final property balance. The carriers of the invention have an excellent balance of crush strength, abrasion resistance, porosity and catalytic performance that make them ideal for a range of catalytic applications. They are based on alpha alumina and the novel process by which they are made assures high porosity and excellent crush strength.

DESCRIPTION OF THE INVENTION

The present invention provides a novel alpha alumina based catalyst carrier having a crush strength, (as measured on a Compton Tensile Tester, model 50-OP), of at least 5 pounds and a settled packing density, (as measured by ASTM D-4699-87, modified by the use of cylinder with an inside diameter of 3 ¾ inches and a length of 18 inches), of at least 38 pounds/cubic foot which comprises first and second alpha alumina components and a titania component wherein the first alpha alumina component is in the form of particles having an average crystallite size of from about 0.4 to about 4 microns providing from about 95 to about 40% of the total weight of alpha alumina in the carrier, the second alpha alumina component is generated in situ by a sol-gel process and providing the balance of the alpha alumina in the carrier and the titania component represents from about 0.05 to about 1.0% of the weight of the final carrier weight.

The parent Application of this present application was filed on Sep. 8, 1993 with the U.S. application Ser. No. 08/118,487. This application taught the use of titania up to an amount of about 0.05 to about 0.5% based on the amount of alumina. The present application is based on the discovery that proportions of the titania component above the range specified in the parent application can be used with advantageous results.

The alpha alumina generated in situ is readily distinguished from the pre-formed alpha alumina particles present in the carrier of the invention. In a photomicrograph of the carrier the pre-formed alpha alumina appears as clearly identifiable individual particles with no internal porosity. By contrast the sol-gel alpha alumina formed in situ has a vermicular structure, that is, it has no clearly defined particulate structure and extensive porosity.

The invention also comprises a process for the production of a catalyst carrier which comprises:

i) forming a mixture comprising:
  a. at least one alpha alumina component with an median particle size of from 3 to about 8 microns and:
  b. a hydrated precursor of alpha alumina in an amount sufficient to provide from about 5 to about 60% by weight of the total weight of alpha alumina in the catalyst carrier product;
  c. from about 5 to about 40%, based on the weight of the alpha alumina, of a burnout material;
  d. a titania compound in an amount of from about 0.55 to about 1.0% calculated as titania; and
  e. water in sufficient quantity to extrude the above mixture;

ii) extruding the mixture into the desired shapes; and iii) firing to convert the precursors to alpha alumina so as to produce a carrier in which alpha alumina particles with a median particle size of from about 3 to about 8 microns are dispersed in a matrix of alpha alumina derived from the seeded precursor material and titania.

The catalyst carrier of the invention may comprise a number of alpha alumina components chosen to contribute to the desired physical properties, including porosity, pore volume, crush strength and the like. Often a combination of two different alpha aluminas is preferred, one component having larger particles mixed with a second component having smaller particles, in weight ratios of from about 10:90 to 90:10. The objective of this is to end up with a surface area, (in this document a reference to "surface area" is understood to mean the BET surface area measured using nitrogen or krypton as the adsorbed gas), in the finished product of from about 0.4 to about 5 $m^2/gm$. The surface area in the finished carrier is somewhat less than for the free alumina particles. Thus a convenient mixture may comprise for example, two types of alpha alumina particles, the first having a surface area of about 1 $m^2/gm$ and the second having a surface area of about 3 to 5 $m^2/gm$.

The precursor of alpha alumina is preferably based on boehmite but good results are also obtained if the precursor comprises a mixture of boehmite with an aluminum trihydrate such as gibbsite or bayerite. Where such a mixture is used it is often preferred to use a weight ratio of the monohydrate, (boehmite), to trihydrate of from about 1:10 to about 1:3 and more preferably from about 1:8 to about 1:4. It is often preferred that, when a sol is formed from the precursor by addition of water, a submicron particle sized seed material is also added. This has the effect of reducing the temperature at which the transition to alpha alumina occurs and reduces the crystal size of the alpha alumina produced upon transformation.

The seed used can be any material that is effective to produce nucleation sites in the precursor so as to reduce the transition temperature at which a transition alumina converts to alpha alumina. Seeds that accomplish this goal generally have the same crystal lattice type as alpha alumina itself and lattice dimensions that do not differ by too much from those of alpha alumina. Clearly the most convenient seed is alpha alumina itself and sub-micron sized particles of alpha alumina are the preferred seed. It is however possible to use other seeds such as alpha ferric oxide and chromium oxide and certain complex oxides of titanium.

The alpha alumina formed from the preferred seeded precursor when the extruded mixture is fired generally has a much finer crystal size than the alpha alumina particles with which the seeded precursor is mixed unless, during firing, it is maintained at a high temperature for a prolonged period.

As produced, the seeded sol-gel material has a sub-micron crystal structure but if it is held at temperatures over 1400° C. for extended periods, crystal growth begins and the size differentiation may become less apparent.

The carrier of the invention preferably has a porosity of at least 50% and more desirably from about 60 to about 75%. The porosity is related to the surface area which is preferably from about 0.4 to about 5, and more preferably from about 0.6 to about 1.2 square meters/gram.

The titania compound is added in an amount that represents from about 0.55 to about 1.0%, calculated as titania, of the weight of the fired carrier. The lower limit is chosen to exclude any overlap with the range claimed in the parent case and should be interpreted to represent a continuum of coverage for the combined parent and child cases for titania contents of from about 0.05 to about 1.0%. Certain forms of alumina and bond material may also contain titania as impurities or components. The contribution of such forms of titania are not included in the amounts specified above. The titania compound should of course be one that readily decomposes at temperatures below those encountered in the conversion of precursors of alpha alumina to the alpha phase. Examples of such titania compounds include organic titanates, alkali metal titanates such as magnesium titanate, and the like. In general those compounds that decompose without emitting undesirable gases are preferred. Generally anatase or hydrated titania is the most preferred. It is believed that the titania may function as a form of crystal growth inhibitor in the alpha alumina formed as a result of the conversion of the seeded precursor.

While it would appear that the alpha alumina formed from the seeded precursor acts in some sense as a matrix binder holding the rest of the alpha alumina particles together, it is usually preferred to add a ceramic bond material to the mixture to give added strength to the fired carrier. Conventional ceramic bond materials can be used in amounts of from about 0.4 to about 3% based on the weight of alumina (calculated in the alpha form) in the composition, and after firing these typically comprise components, (expressed as the oxides), such as silica, alumina, alkaline earth metal oxides, alkali metal oxides, iron oxide and titanium oxide, with the first two being the dominant components and the titania and iron oxide;each representing less than about 1% by weight.

DESCRIPTION OF PREFERRED EMBODIMENTS

The invention is further described with reference to the following examples which are for the purposes of illustration only and are not intended to imply any necessary limitation on the essential scope of the invention.

Example 1

This Example details the preparation of the carriers made using the formulations described in the following Example. The exact identification of the components is given in Table 1 below. The mixing process used was as follows:
The ceramic components are mixed with a burn-out material, (walnut shell flour), and boric acid for about a minute. Water and the seed component are added, the water being in an amount that is necessary to make the mixture extrudable. Generally this is about 30% by weight. The mixture is mixed for about two to four minutes and then about 5% by weight based on the weight of the ceramic components, of vaseline is added as an extrusion aid. The mixture is then mixed for a further 2 to 4 minutes before being extruded in the form of hollow cylinders and dried to less than 2% uncombined water. These were then fired in a tunnel kiln with a maximum temperature of about 1500° C. for about 4 hours.

TABLE 1

| CARRIER COMPOS. | CARRIER 1 | CARRIER C-1 | CARRIER C-2 |
|---|---|---|---|
| ALPHA #1 * | 45.5% | 46.0% | 46.0% |
| ALPHA #2 * | 28% | 27.6% | 27.6% |
| ALPHA #3 * (SEED) | 2.0% | 2.2% | 2.2% |
| GIBBSITE * | 18.7% | 18.4% | 18.4% |
| BOEHMITE * | 4.5% | 4.5% | 4.5% |
| CERAMIC BOND * | 1.3% | 1.3% | 1.3% |
| TiO$_2$ * | 0.6% | 0.4% | 0.4% |
| ORG. BURN-OUT ** | 11% | 15% | 11% |
| PET. JELLY ** | 5% | 5% | 24% |
| BORIC ACID ** | 0.15% | 0.15% | 0.15% |
| WATER (to make extrudable) | about 30% | about 30% | about 30% |

* indicates "ceramic components" and percentages given are based on 100% of the ceramic components.
** percentages are based on total weight of ceramic components. Water is added in an amount to make the above mixture extrudable. "Alpha #1" is a commercial alpha alumina that has a median particle size of 3 to 3.4 microns, a BET surface area of about 0.9 to about 1.4 m$^2$/gm, a crystallite size of 1.6 to 2.2 microns and a soda content of 0.02 to 0.06%. "Alpha #2" is an alpha alumina with a median particle size of 4.0 to 8.0 microns, a surface area of 3.0 to 5.0 m$^2$/gm, a crystallite size of from 0.4 to 0.8 micron and a soda content of 0.1 to 0.3%. "Alpha #3" is an alpha alumina that was used as the seed for the gibbsite and boehmite precursors of alpha alumina. Its median particle size was less than 1.0 micron. The gibbsite had a median particle size of from 4.0 to 20 microns and the boehmite was dispersible as a sol. The titanium oxide was in a hydrated form and had a surface area of about 250 m$^2$/gm.

* indicates "ceramic components" and percentages given are based on 100% of the ceramic components.

** percentages are based on total weight of ceramic components. Water is added in an amount to make the above mixture extrudable.

"Alpha #1" is a commercial alpha alumina that has a median particle size of 3 to 3.4 microns, a BET surface area of about 0.9 to about 1.4 m$^2$/gm, a crystallite size of 1.6 to 2.2 microns and a soda content of 0.02 to 0.06%.

"Alpha #2" is an alpha alumina with a median particle size of 4.0 to 8.0 microns, a surface area of 3.0 to 5.0 m$^2$/gm, a crystallite size of from 0.4 to 0.8 micron and a soda content of 0.1 to 0.3%

"Alpha #3" is an alpha alumina that was used as the seed for the gibbsite and boehmite precursors of alpha alumina. Its median particle size was less than 1.0 micron.

The gibbsite had a median particle size of from 4.0 to 20 microns and the boehmite was dispersible as a sol.

The titanium oxide was in a hydrated form and had a surface area of about 250 m$^2$/gm.

The ceramic bond contained components, (expressed as the oxides), in the following approximate proportions: 60% silica, 29% alumina, 3% of calcium oxide, 2% of magnesia, 4% of alkali metal oxides and less than 1% each of ferric oxide and titania.

All the carriers were fired at 1390° C. The C-1 and C-2 carriers are typical of those described and claimed in the parent application. As will be appreciated from the data presented below the carriers of the present invention are at least as good as the excellent carriers described therein.

TABLE 2

|  | CARRIER 1 | CARRIER C-1 | CARRIER C-2 |
| --- | --- | --- | --- |
| SELECTIVITY | +1.2/−12 | +1.3/−8 | +1.2/−6 |
| S.A. (M$^2$/GM) | 0.66 | 0.78 | 0.72 |
| P.D. (LB/FT$^3$) | 50.14 | 51.8 | 48.6 |
| C.S. (LB) | 17.9 | 18.5 | 15.3 |

"Selectivity" This is measured using a standard catalyst formulation deposited on the carrier and assessed against the selectivity shown by the same standard catalyst on a standard carrier. In each case a standard gas flow containing ethylene, oxygen and inert gases and comprising 25% by volume of ethylene was passed over the catalyst. The standard conditions are those to achieve a conversion of 40% of the oxygen content of the flow. Clearly if the selectivity of the standard can be exceeded by even a small amount, this is an advantage. This is even more attractive if it can be achieved at a lower temperature.

The standard catalyst/carrier combination, under the conditions of the evaluation had a selectivity of 81.7% at a reaction temperature of 235° C. Table 2 above indicates the average of two runs. The first figure given is the increase in selectivity in percentage points over the standard catalyst/carrier combination and the second figure indicates the temperature difference in degrees at which the selectivity figure was obtained. Thus, for example, "+1/−4" would indicate that the selectivity was 1% better than the standard and this was achieved at 4° C. below the temperature at which the standard catalyst/carrier operated.

"P.D." is the settled packing density as measured by ASTM D-4699- 87, modified as described above, or the equivalent. The "Crush Strength", (called here "C.S."), of the carrier is measured as described above. The "surface area", (S.A.), is the BET surface area measured using nitrogen or krypton as the adsorbate.

As can be seen, the carriers in accordance with the invention allow a higher degree of selectivity to the desired product while operating at a lower temperature. These improvements are considered extremely significant.

The carriers of the present invention are useful in a variety of catalytic applications in which a gaseous stream is contacted with a catalyst suported on a carrier at elevated temperatures. There are many such processes in the petrochemical industry but the present carrier has proved itself particularly suitable in the catalytic formation of ethylene oxide from a gas stream comprising ethylene and oxygen. The utility of the present invention is however not so limited.

What is claimed is:

1. A process for the production of a catalyst carrier which comprises:
   i) forming a mixture comprising:
   a. at least one alpha alumina component with an median particle size of from 3 to about 8 microns and:
   b. a seeded, hydrated precursor of alpha alumina in an amount sufficient to provide from about 5 to about 60% by weight of the total weight of alpha alumina in the catalyst carrier product;
   c. from about 5 to about 40%, based on the weight of the alpha alumina, of a burnout material;
   d. a titanium compound in an amount, calculated as titania, of from about 0.55 to about 1.0% based on the weight of the alpha alumina; and
   e. water in sufficient quantity to extrude the above mixture;
   ii) extruding the mixture into the desired shapes; and
   iii) firing to convert all the precursor alumina to alpha alumina so as to produce a catalyst carrier in which alpha alumina particles with a median particle size of from about 3 to about 8 microns are dispersed in a matrix of alpha alumina derived from the seeded precursor material and titania.

2. A process acording to claim 1 in which the titanium compound is selected from the group consisting of anatase, hydrated titania and mixtures thereof.

3. A process according to claim 2 in which the titanium compound is a hydrated titania.

4. A process according to claim 1 in which the precursor of alpha alumina comprises a boehmite.

5. A process according to claim 1 in which the precursor of alpha alumina comprises alumina trihydrate.

6. A process according to claim 1 in which the precursor of alpha alumina is seeded with sub-micron sized particles of alpha alumina in an amount that is from about 0.2 to about 5% by weight based on the total alumina weight, measured as alpha alumina, in the catalyst carrier.

7. A process according to claim 1 in which a ceramic bond material comprising less than about 1% of titania, is added to the extrudable mixture in an amount that is from about 1 to about 3% of the weight of the alumina components, expressed as alpha alumina, in the mixture.

8. A process for the production of a catalyst carrier which comprises:
   i) forming a mixture comprising:
   a. an alpha alumina having a first component with a median particle size of from about 2 to about 4 microns and a second component with a median particle size of about 4 to about 8 microns;
   b. a seeded, hydrated precursor of alpha alumina in an amount sufficient to provide from about 5 to about 60% by weight of the total weight of alpha alumina in the catalyst carrier product
   c. from about 5 to about 40%, based on the weight of the alpha alumina, of a burnout material; d. from about 0.4 to about 3% based on the weight of alumina in the composition expressed as alpha alumina, of a ceramic bond material comprising less than about 1% of titania;
   e. from about 0.55 to about 1.0% by weight, based on the total alumina weight in the mixture expressed as alpha alumina, of titania; and
   f. water in sufficient quantity to extrude the above mixture;
   ii) extruding the mixture into the desired shape; and
   iii) firing to convert all the transition alumina to alpha alumina so as to produce a catalyst carrier in which alpha alumina particles with a median particle size of from about 3 to about 8 microns are dispersed in a matrix of alpha alumina derived from the seeded precursor material and titania.

9. A process according to claim 8 in which the precursor of alpha alumina is seeded with a sub-micron sized particles of alpha alumina in an amount that is from about 0.2 to about 5% by weight based on the total alumina weight, measured as alpha alumina, in the catalyst carrier.

* * * * *